United States Patent
Yan et al.

(10) Patent No.: US 12,330,372 B2
(45) Date of Patent: Jun. 17, 2025

(54) MULTI-DEGREE-OF-FREEDOM ADDITIVE MIXED WEAVING APPARATUS AND METHOD FOR CONTINUOUS FIBER REINFORCED COMPOSITE MATERIAL

(71) Applicant: HUAZHONG UNIVERSITY OF SCIENCE AND TECHNOLOGY, Hubei (CN)

(72) Inventors: Chunze Yan, Hubei (CN); Lei Yang, Hubei (CN); Wenbo Wang, Hubei (CN); Zhanpeng Pi, Hubei (CN); Bin Su, Hubei (CN); Zhigang Xia, Hubei (CN); Yusheng Shi, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 160 days.

(21) Appl. No.: 18/167,092

(22) Filed: Feb. 10, 2023

(65) Prior Publication Data
US 2024/0173917 A1    May 30, 2024

(30) Foreign Application Priority Data
Nov. 28, 2022    (CN) .......................... 202211513039.4

(51) Int. Cl.
*B29C 64/245*    (2017.01)
*B29C 64/165*    (2017.01)
(Continued)

(52) U.S. Cl.
CPC .......... *B29C 64/245* (2017.08); *B29C 64/165* (2017.08); *B29C 64/209* (2017.08);
(Continued)

(58) Field of Classification Search
None
See application file for complete search history.

(56) References Cited

U.S. PATENT DOCUMENTS

| 2009/0315056 A1* | 12/2009 | Kim .................... H10H 20/8581 |
| | | 257/E33.059 |
| 2017/0274585 A1* | 9/2017 | Armijo ................. B29C 70/384 |

FOREIGN PATENT DOCUMENTS

| CN | 104097326 A | * 10/2014 | |
| CN | 107914387 A | * 4/2018 | ............. B33Y 10/00 |

OTHER PUBLICATIONS

Machine translation CN104097326.*
Machine translation CN107914387.*

* cited by examiner

*Primary Examiner* — Christopher T Schatz
(74) *Attorney, Agent, or Firm* — JCIPRNET

(57) ABSTRACT

A lower surface of the printing platform is provided with a displacement device, and the displacement device is used to rotate the printing platform horizontally and adjust a pitch angle of the printing platform. The additive device is located above the printing platform and is connected to one end of the robotic arm, and the additive device is provided with a pressing roller. The robotic arm includes rotating joints used to drive the additive device to print and melt a fiber tow on the printing platform according to a predetermined path. The fiber pulling device is disposed on the printing platform to grab the reinforced fiber and make it cross-weave with the horizontally printed fiber tow on the horizontal plane. When working, the pressing roller is always perpendicular to the printing platform to press the melted fiber tow and the reinforced fiber cross-woven with the fiber tow.

6 Claims, 8 Drawing Sheets

(51) Int. Cl.
*B29C 64/209* (2017.01)
*B29C 64/236* (2017.01)
*B29C 64/241* (2017.01)
*B33Y 10/00* (2015.01)
*B33Y 30/00* (2015.01)

(52) U.S. Cl.
CPC .......... *B29C 64/236* (2017.08); *B29C 64/241* (2017.08); *B33Y 10/00* (2014.12); *B33Y 30/00* (2014.12)

MULTI-DEGREE-OF-FREEDOM ADDITIVE MIXED WEAVING APPARATUS AND METHOD FOR CONTINUOUS FIBER REINFORCED COMPOSITE MATERIAL

CROSS-REFERENCE TO RELATED APPLICATION

This application claims the priority benefit of China application serial no. 202211513039.4, filed on Nov. 28, 2022. The entirety of the above-mentioned patent application is hereby incorporated by reference herein and made a part of this specification.

BACKGROUND

Technical Field

The disclosure belongs to the technical field of additive manufacturing, and in particular, relates to a multi-degree-of-freedom additive mixed weaving apparatus and method for a continuous fiber reinforced composite material.

Description of Related Art

Continuous fiber reinforced composite materials are structural materials composed of continuous fiber and resin, metal, ceramic, and other matrices. High specific strength, high specific modulus, low density, high strength, fatigue resistance, shock resistance, and high temperature resistance are some of the advantages specifically provided by this kind of material. Therefore, continuous fiber reinforced composite materials are widely used in many fields such as aviation, aerospace, national defense, sports equipment, etc., and are called as national strategic materials.

Formation of a conventional continuous fiber reinforced composite material requires a series of complicated processes such as the use of molds for fiber placement, hot-press curing, and machining, so the production process is long and high costs are required. The additive manufacturing technology (including 3D printing, etc.) can make good use of advantage of both material properties and forming methods. The transition from prototype printing to direct printing of functional parts has expanded the scope and depth of 3D printing industrial applications. As such, the problems of cumbersome forming process of the continuous fiber reinforced composite materials and inability to manufacture structurally complex parts are expected to be solved.

In the additive manufacturing of continuous fiber reinforced composites, the fused deposition modeling (FDM) process is employed most of the time. In FDM, by heating the thermocouple to a molten state, the object is formed by printing layer by layer, and that the moldless and rapid prototyping of complex structures are achieved. However, the continuous fiber reinforced composite materials prepared by FDM may exhibit several disadvantages, including: 1) it is difficult to realize the fusion of continuous fibers; 2) the spatial shaping of continuous fibers cannot be achieved; and 3) the degree of anisotropy of the formed parts is high, and the inter-layer tear resistance is weak. In the existing additive manufacturing of continuous fiber reinforced composite materials, the problems of the weaving of fibers can only be printed layer by layer along the horizontal plane and poor inter-layer bonding of each fiber layer still exists.

SUMMARY

In response to the above defects of the related art, the disclosure aims to provide a multi-degree-of-freedom additive mixed weaving apparatus for a continuous fiber reinforced composite material capable of achieving multi-directional winding with the use of a reinforced fiber on a printed fiber layer during a part printing process to improve the strength of the fiber layer in a three-dimensional direction through the use of a multi-degree-of-freedom robotic arm and a two-degree-of-freedom displacer and making fiber layers tightly bonded through the use of a pressing roller.

To achieve the above, the disclosure provides a multi-degree-of-freedom additive mixed weaving apparatus for a continuous fiber reinforced composite material, and the apparatus includes a printing platform, a robotic arm, an additive device, and a fiber pulling device.

A lower surface of the printing platform is provided with a displacement device, and the displacement device is used to rotate the printing platform horizontally and adjust a pitch angle of the printing platform.

The additive device is located above the printing platform and is connected to one end of the robotic arm, and the additive device is provided with a pressing roller.

The robotic arm includes a plurality of rotating joints used to drive the additive device to print and melt a fiber tow on the printing platform according to a predetermined path.

The fiber pulling device is disposed on the printing platform and is used to grab a pre-set vertical reinforced fiber and make it cross-weave with the fiber tow in each layer of printing.

When working, the robotic arm drives the additive device to print, and the displacement device drives the printing platform to move with the additive device, so that the pressing roller is always perpendicular to the printing platform to press the melted fiber tow and the reinforced fiber cross-woven with the fiber tow.

Further, the additive device includes a fixed platform, an upper surface of the fixed platform is connected to one end of the robotic arm, and a lower surface of the fixed platform is provided with a tow feeding mechanism and a laser. The tow feeding mechanism is used to output the fiber tow onto the printing platform, and the laser is used to melt the fiber tow.

Further, the pressing roller is disposed at a center of a lower surface of the fixed platform, and the tow feeding mechanism and the laser are disposed at one side of the pressing roller.

Further, lower ends of the pressing roller, the tow feeding mechanism, and the laser all face toward a same processing point on the printing platform.

Further, a cutting device is also disposed on the fixed platform, and the cutting device is disposed on another side of the pressing roller for cutting the fiber tow sent out by the tow feeding mechanism.

Further, the fiber pulling device includes a grabbing unit and a connecting rod driving mechanism.

The connecting rod driving mechanism includes a guiding rod, a slider, a connecting rod, and a crank, an upper end of the guiding rod is fixed onto the displacement device. The slider is disposed on the guiding rod and is able to move up and down on the guiding rod. One end of the connecting rod is connected to the slider, and another end thereof is connected to one end of the crank. The other end of the crank is fixed onto a lateral side of the printing platform, and the grabbing unit is disposed at a connecting joint of the connecting rod and the crank. Preferably, the crank and a fixing point of the printing platform are located directly above the slider.

Further, the printing platform is further provided with a clamping device used to fix the reinforced fiber cross-woven with each layer of fiber tow. Preferably, the robotic arm includes 6 rotating joints. More preferably, the displacement device includes a base, a rotating unit, and a turning unit from bottom to top. An upper end of the turning unit is connected to the lower surface of the printing platform, and a lower end thereof is connected to the base. Upper and lower ends of the rotating unit are respectively connected to the turning unit and the base.

According to another aspect of the disclosure, the disclosure further provides a multi-degree-of-freedom additive mixed weaving method for a continuous fiber reinforced composite material. The method is implemented by the multi-degree-of-freedom additive mixed weaving apparatus for the continuous fiber reinforced composite material according to the above, and the method includes the following steps.

In S1, a reinforced fiber is arranged on the printing platform in advance.

In S2, the robotic arm drives the additive device to print and melt the fiber tow on the printing platform according to the predetermined path, and the displacement device drives the printing platform to move with the additive device, so that the pressing roller is always perpendicular to the printing platform to press the melted fiber tow.

In S3, printing stops when printing reaches the reinforced fiber, the fiber pulling device is driven to grab the reinforced fiber, the reinforced fiber and fiber tow that is printed on a current layer are cross-woven, and the pressing roller presses the reinforced fiber after weaving.

In S4, the clamping device fixes the reinforced fiber after pressing, and the robotic arm then drives the additive device to restart printing a subsequent position of the layer until the layer is printed.

In S5, steps S2 to S4 are repeated to complete the additive mixed weaving, and the reinforced fiber between the fiber tows in two adjacent layers is wound in a wave shape.

Further, in step S3, the slider moves upward on the guiding rod when the fiber pulling device grabs the reinforced fiber. The slider drives the connecting rod to rotate around a connecting point between the connecting rod and the slider and then drives the crank to rotate around a connecting point between the crank and the printing platform, so that the grabbing unit rotates around the connecting point between the crank and the printing platform to pull the reinforced fiber, and that the reinforced fiber is cross-woven with the printed fiber tow. Preferably, the reinforced fiber and the printed fiber tow are cross-woven in a cross shape.

Further, the composite material after additive mixed weaving includes a plurality of wavy reinforced fibers. Preferably, the wavy reinforced fibers are located on a same vertical plane. Preferably, an included angle between the plurality of wavy reinforced fibers on the same vertical plane and a horizontal plane is an acute angle and/or a right angle.

The above technical solutions provided by the disclosure have the following advantages compared to the related art.

1. In the multi-degree-of-freedom additive forming device provided by the disclosure, a two-degree-of-freedom displacer capable of rotating on a horizontal plane and turning in the up and down directions is arranged under the printing platform, and the additive device is arranged on a multi-degree-of-freedom robotic arm. When printing, the multi-degree-of-freedom robotic arm can move and work with the two-degree-of-freedom printing platform at the same time, so that the additive device can accurately print on the printing platform according to the predetermined path. Moreover, the pressing roller on the additive device can always be kept perpendicular to the printing platform. In this way, the fiber tow can be precisely pressed after each printing of the fiber tow, so that the fiber tow is denser and the adjacent tow can be closely combined.

2. In the multi-degree-of-freedom additive forming device provided by the disclosure, by setting the fiber pulling device, when printing each layer of fiber tow, the reinforced fiber is cross-woven at the predetermined position. In this way, the inter-layer bonding force of the printed multi-layer fiber tow in the direction perpendicular to the printing platform is strengthened. Moreover, the fiber pulling device, the robotic arm, and the printing platform can all move in coordination to ensure that each unit does not interfere with one another, so the printing efficiency is prevented from being affected.

3. In the multi-degree-of-freedom additive forming device provided by the disclosure, the additive device includes one fixed platform. The upper surface of the fixed platform is connected to one end of the robotic arm, and the pressing roller, the tow feeding mechanism, the cutting device, and the laser are integrated on the lower surface. The tow feeding mechanism is used to output the fiber tow onto the printing platform, and the laser is used to melt the fiber tow. The pressing roller presses the fiber tow tightly, and the cutting device can cut the fiber tow evenly after printing. In short, in the disclosure, the formed fibers are densified by using the pressing roller. Further, through the cutting process of the outputted fiber filaments, the physical clarity of the continuous fiber boundary is achieved. The position of the fiber can be adjusted quickly, the utilization rate of the tow feeding can be improved, and the continuous fiber can be printed efficiently on the curved surface through the robot.

4. In the additive forming device provided by the disclosure, the fiber pulling device includes the grabbing unit and the connecting rod driving mechanism. When the connecting rod driving mechanism drives the grabbing unit to grab the reinforced fiber thread, the slider moves up and down to control the crank to pull the reinforced fiber thread back and forth at a specific position to be cross woven with the fiber filament for each layer printed. A continuous fiber-reinforced composite that resists inter-layer tearing is finally formed with a simple structure. Further, the movement stroke of the connecting rod drive mechanism can be adjusted as required by turning the displacer up and down at a certain angle. When the displacer ascends and approaches the connecting rod driving mechanism, its movement stroke becomes smaller, and when the displacer descends away and moves away from the connecting rod driving mechanism, its movement stroke becomes larger.

5. In the multi-degree-of-freedom additive forming method provided by the disclosure, the multi-layered fiber tow is cross-woven with the wavy reinforced fiber. Further, the plane where the multiple wavy reinforced fibers are located is perpendicular to the horizontal plane, and the single wavy line is parallel to the vertical direction or forms an acute angle with the horizontal plane direction. In this way, the fiber tow is reinforced in the vertical direction or in the direction forming an acute angle with the horizontal plane after being wound by the reinforced fiber. A plurality of the aforementioned wavy reinforced fibers is provided, and each wavy line is on the same plane, so that the overall strength of the printed composite material part is enhanced.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure.

Embodiment 1

Figure 1:
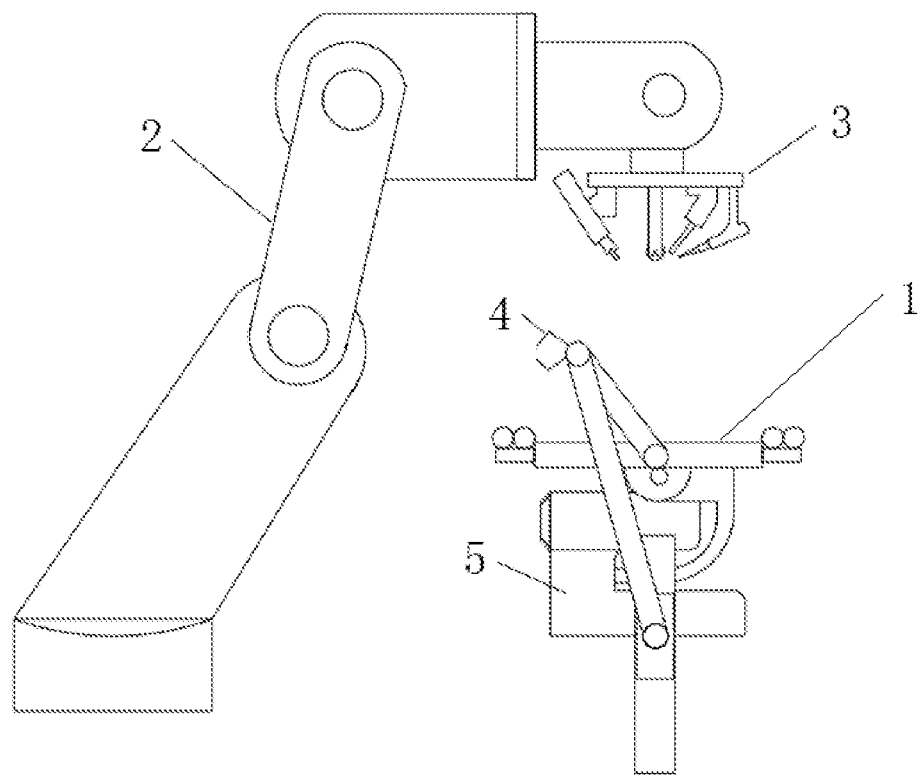
FIG. 1 is schematic view of a robotic manufacturing system for a continuous fiber reinforced composite material resistant to inter-layer tearing disclosed by an embodiment of the disclosure.

As shown in FIG. 1, in this embodiment, a multi-degree-of-freedom additive mixed weaving apparatus for a continuous fiber reinforced composite material is provided, and the apparatus includes a printing platform 1, a robotic arm 2, an additive device 3, and a fiber pulling device 4.

Herein, the printing platform 1 is a place for carrying a printed composite material. A lower surface of the printing platform is provided with a displacement device 5, and the displacement device 5 is a two-degree-of-freedom device and is able to make the printing platform 1 rotate on a horizontal plane and turn upside down, descend, and ascend in up and down directions at a certain angle. In this embodiment, a fully automatic printing system is formed with the use of a welding positioner with a suitable size to work with the additive device and the robotic arm. The additive device 3 is a multi-component integrated additive processing device, is located above the printing platform 1, and is connected to a processing end of the robotic arm 2. The additive device 3 is further provided with a pressing roller 31. The robotic arm 2 includes a plurality of rotating joints used to drive the additive device 3 to move along a predetermined path to print and melt a fiber tow on the printing platform 1. The fiber pulling device 4 is disposed on a front side of the printing platform 1 and is used to grab a pre-set reinforced fiber and make the reinforced fiber cross-weave with the fiber tow in each layer of printing.

When printing, an external controller controls the robotic arm 2 to drive the additive device 3 to print according to the predetermined path and then controls the displacement device 5 to drive the printing platform 1 to move with the additive device 3. As such, the pressing roller 31 can always be perpendicular to the printing platform 1 during the printing process, so as to press each melted fiber tow and the reinforced fiber cross-woven with the melted tow. In this way, the single-layer fiber is dense, and the inter-layer fibers are tightly bonded.

In a preferred embodiment, the additive device 3 includes a fixed platform 32, an upper surface of the fixed platform 32 is connected to one end of the robotic arm 2, and a connecting end of the two is rotatable as a joint of the robotic arm. A lower surface of the fixed platform 32 is provided with a tow feeding mechanism 33 and a laser 34. Herein, the tow feeding mechanism 33 is used to output the fiber tow onto the printing platform 1, and the laser 34 is used to emit laser light to melt the outputted fiber tow.

In a preferred embodiment, the pressing roller 311 is disposed at a center of a lower surface of the fixed platform 32, and both the tow feeding mechanism 33 and the laser 34 are disposed at a right side of the pressing roller 31. Lower ends of the pressing roller 31, the tow feeding mechanism 33, and the laser 34 all face toward a same processing point on the printing platform 1, and the lower ends of the three are all located on a same plane.

In a preferred embodiment, a cutting device 35 is also disposed on the fixed platform 32, and the cutting device 35 is disposed at a left side of the pressing roller 31. After the tow feeding mechanism 33 extrudes a carbon fiber tow, the laser 34 first detects whether there is a fiber tow, and when detecting that there is a fiber tow, the laser 34 irradiates the fiber tow to melt it. The pressing roller located behind the tow feeding mechanism then presses the melted tow vertically, so that the melted tow can be tightly connected. The preceding steps are repeated to print layer by layer. When the printing reaches the end of the last layer, the cutting device located behind the pressing roller controls a cutting knife at a lower end to cut off the carbon fiber tow, and then all the mechanisms are reset to complete the printing of the part.

In a preferred embodiment, the fiber pulling device 4 includes a grabbing unit 41 and a connecting rod driving mechanism.

The connecting rod driving mechanism includes a guiding rod 42, a slider 43, a connecting rod 44, and a crank 45, an upper end of the guiding rod 42 is fixed onto the displacement device 5, so the guiding rod 42 can be raised or lowered with the displacement device 5. The slider 43 is disposed on the guiding rod 42 and can move up and down on the guiding rod 42 driven by a motor. One end of the connecting rod 44 is connected to the slider 43, and another end is movably connected to one end of the crank 45 (for example, it is connected in a hinged manner). The other end of the crank 45 is fixed onto the front side of the printing platform to avoid interfering with the work of the various mechanisms on the surface of the printing platform. The grabbing unit 41 is disposed at a connecting joint of the connecting rod 44 and the crank 41, and when the slider 43 slides up and down, the crank and the connecting rod are driven to swing left and right, so that the grabbing unit 41 can also swing left and right. When the displacement device turns upside down at a certain angle and ascends relative to the printing platform 1 and approaches the grabbing unit 4, the swing range of the grabbing unit 41 is smaller. When the displacement device turns upside down at a certain angle and descends relative to the printing platform 1 and moves away from the grabbing unit 41, the swinging range of the grabbing unit 41 is larger.

In a preferred embodiment, the crank 42 and a fixing point of the printing platform are located directly above the slider 43. so that the left and right swing strokes of the grabbing unit 41 can be the same, which is suitable for grabbing the reinforced fibers at different positions.

In a preferred embodiment, the printing platform 1 is further provided with a clamping device 11. Two sets of clamping devices 11 are provided and are disposed on the left and right sides of the printing platform 1. Each set of clamping devices includes two clamping rollers arranged horizontally in the front and rear directions, and the two clamping rollers can be moved closer or farther away under the driving of a power device (e.g., a motor) to fix the reinforced fibers cross-woven with each layer of fiber tow.

Preferably, the robotic arm 2 includes a base and at least 5 mechanical rotating shafts, and the connecting pars between two rotating shafts form at least 4 rotating joints. The lowermost mechanical shaft is connected to the base to form 1 rotating joint, and the uppermost mechanical shaft is connected to the additive device to form 1 rotating joint, so a total of at least 6 rotating joints are formed. In this way, at least 6 degrees of freedom of the rotational movement of the additive device can be achieved, so that the additive manufacturing of parts with complex shapes is accomplished.

The above embodiments relate to the connection relationship between components, and the related flexible connections can use conventional connection methods such as conventional screw connection, hinge connection, or pin rod connection. The fixed connection methods involved can adopt conventional methods such as integrated forming, welding, and bolting, which are not the focus of the disclosure.

Embodiment 2

With reference to FIG. 1, in this embodiment, a multi-degree-of-freedom additive mixed weaving apparatus for a continuous fiber reinforced composite material is provided, which includes a printing platform 1, a 6-degree-of-freedom robotic arm 2, an additive device 3, and a fiber pulling device 4. The four parts work with each other, and on the basis of high continuity and high-efficiency forming, the ability of the printed part to resist interlayer tearing can be strengthened.

Herein, the printing platform 1 is a place for carrying a printed composite material. A lower surface of the printing platform 1 is provided with a displacement device 5, and the displacement device 5 is a two-degree-of-freedom device and is able to make the printing platform 1 rotate on a horizontal plane and turn upside down, descend, and ascend in up and down directions at a certain angle. In this embodiment, a fully automatic printing system is formed with the use of an external controller and a welding positioner with a suitable size to work with the additive device and the robotic arm. The external controller of the system is equipped with a printing program with a predetermined printing path. The additive device 3 is a multi-component integrated additive processing device, is located above the printing platform 1, and is connected to a processing end of the robotic arm 2. The additive device 3 is further provided with a pressing roller 31. The robotic arm 2 is used to drive the additive device 3 to move along the predetermined path to print and melt a fiber tow on the printing platform 1. The fiber pulling device 4 is disposed on a front side of the printing platform 1 and is used to grab a pre-set reinforced fiber and make the reinforced fiber cross-weave with the fiber tow of printing.

Figure 2:
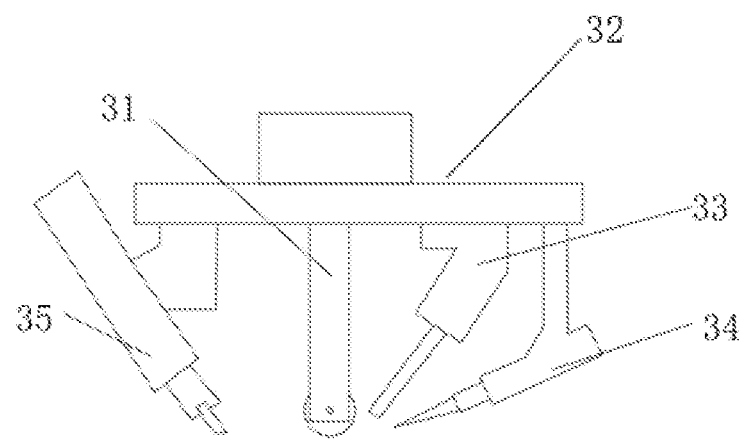
FIG. 2 is schematic structural view of an additive device disclosed by an embodiment of the disclosure.

As shown in FIG. 2, it is an additive device mounted on the end of the 6-axis robotic arm 2. The additive device includes a device platform 32 on which a pressing roller 31, a tow feeding mechanism 33, a laser 34, and a cutting device 35 are integrated. The robotic arm 2 is controlled by the external controller to print a fiber-reinforced composite part layer by layer. Herein, the tow feeding mechanism 33 is used for extruding a carbon fiber tow. The laser 34 is located in front of the tow feeding mechanism, is used to detect whether there is a fiber tow (the detection function may be implemented by setting a fiber sensor, etc.), and irradiates a high-energy laser to make it melt. The laser is a semiconductor laser, and the speckle diameter of the laser may be adjusted to suit filaments of different diameters. The pressing roller 31 is located behind the tow feeding mechanism 33 and is used to presses the melted tow, so that the melted tow can be tightly connected. In this way, it is printed layer by layer, and when the printing reaches the end of the last layer, the cutting device 35 located behind the pressing roller 31 controls a cutting knife at an end portion to cut off the carbon fiber tow, and then all the moving mechanisms are reset to complete the printing of the part.

Figure 3:
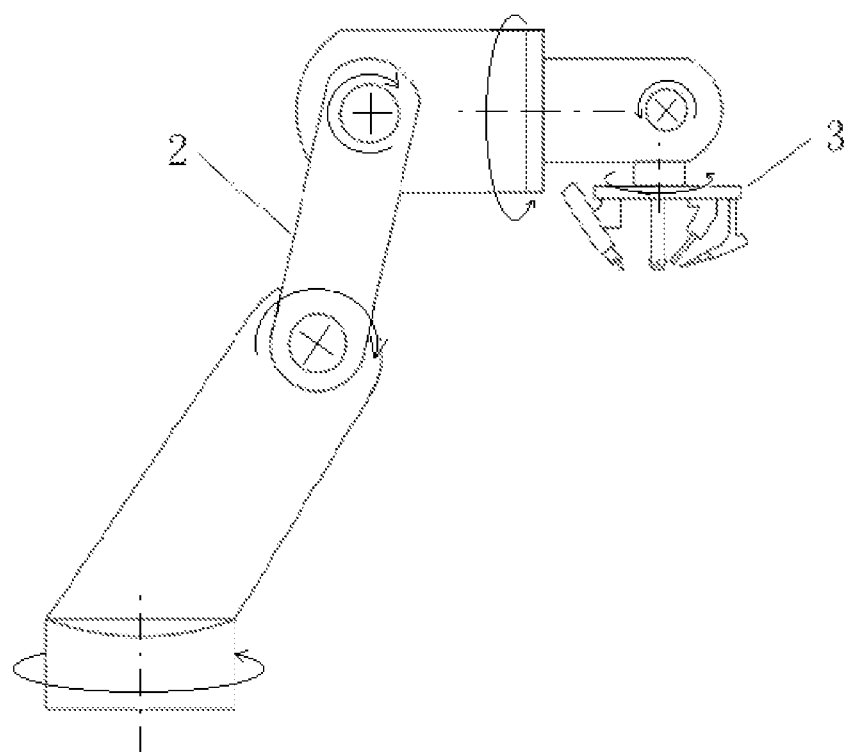
FIG. 3 is a schematic view of a 6-degree-of-freedom multi-axis robotic arm disclosed by an embodiment of the disclosure.

As shown in FIG. 3, it is a schematic view of the structure of the 6-degree-of-freedom robotic arm used in this embodiment. Herein, the six arrows individually indicate the directions in which the six axes can rotate, ensuring that the robotic arm can drive the additive device to complete the forming process at any angle and trajectory to meet the forming needs. When the additive device outputs fiber tows and the pressing roller presses the melted fiber tows, the apparatus controls the displacement device 5 at all times to ensure the vertical state of the printed fiber tow layer and the pressing roller 31. The robot arm can achieve fully automatic work, is controlled by a background program in the external controller, can work with the movement of the additive device, the fiber pulling device, and the displacement device, and can precisely control the cooperative operation among the various moving devices.

Figure 4:
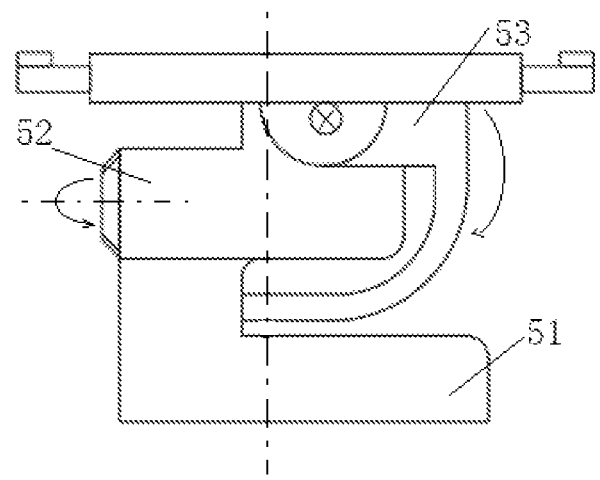
FIG. 4 is a schematic view of a processing platform for a 2-degree-of-freedom displacer disclosed by an embodiment of the disclosure.

As shown in FIG. 4, it is a schematic structural view of the displacement device 5 of this embodiment. The displacement device 5 is fixed onto the lower surface of the printing platform 1. The displacement device includes a base 51 and a horizontal rotating unit 52 and a turning unit 53 arranged on the base. One end of the turning unit 53 is connected to the printing platform 1, and the turning unit 53 can drive the printing platform 1 to turn upside down, descend, and ascend at a certain angle in the up and down directions for adjusting a pitch angle of the printing platform 1. The rotating unit 52 can rotate in vertical direction on the horizontal plane (the arrow direction in the figure).

Through these two degrees of freedom of the displacement device 5, the vertical pressing of the pressing roller 31 and the formed fiber tow may be achieved. The displacement device can adjust the angle and position of the printing platform according to the specified needs, so that the pressing roller and the formed part are always in a vertical state, and the displacement device can also work with other moving devices to complete the production of parts of various shapes. The printing platform 1 is also provided with a clamping device 11 for reinforcing fibers, which is used to fix the reinforced fibers after winding and weaving.

Figure 5:
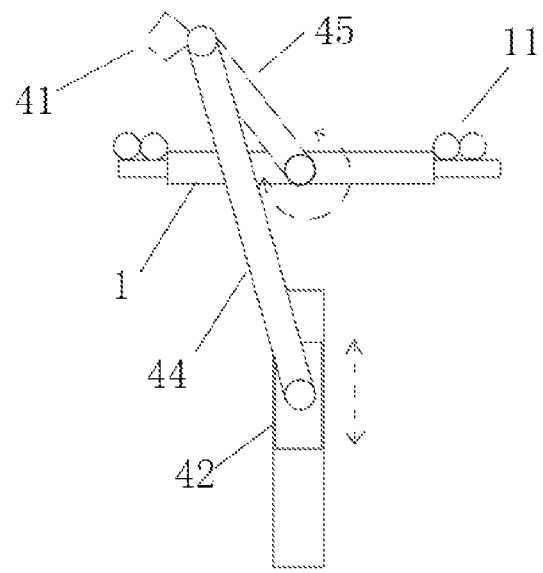
FIG. 5 is a schematic view of a connecting rod driving mechanism disclosed by an embodiment of the disclosure.

As shown in FIG. 5, it is the connecting rod driving mechanism adopted in this embodiment. In this embodiment, the apparatus controls the slider 43 to slide up and down to drive the crank to swing left and right according to the arc track and make the connecting rod swing left and right. In this way, the grabbing unit 41 can also swing left and right to grab and change the position of the reinforced fiber, so that the reinforced fiber crosses each layer of printed fiber tow. Further, the reinforced fiber covers each layer of fiber tow, and the reinforced fiber is wound in an S-shape on the fiber tow of adjacent layer in a direction perpendicular to the fiber tow.

The operating principle of the apparatus is provided as follows.

Figure 6:
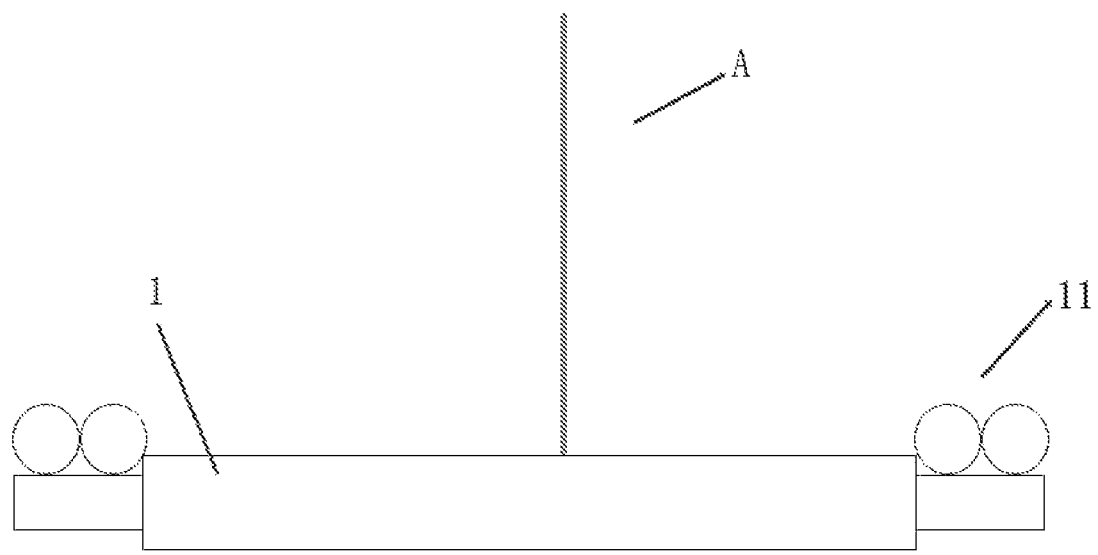
FIG. 6 is an initial state of a processed surface disclosed by an embodiment of the disclosure.
Figure 7:
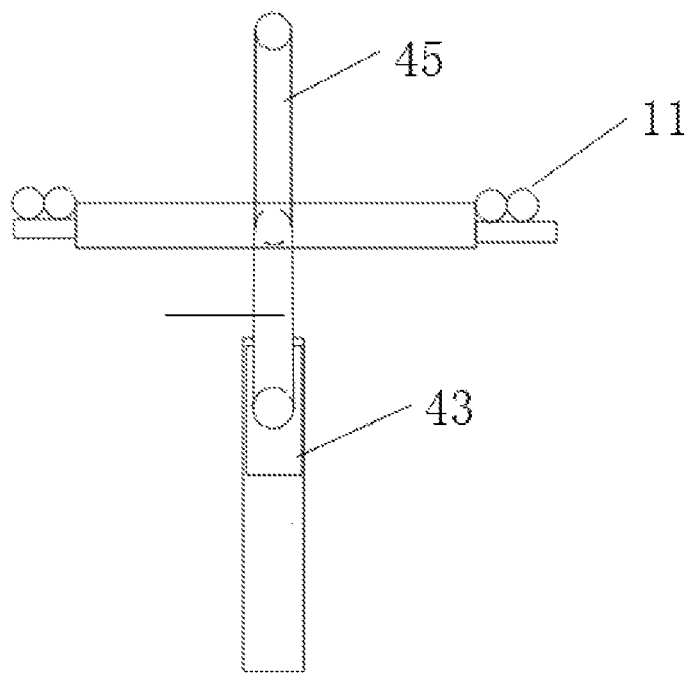
FIG. 7 is a fiber pulling device disclosed by an embodiment of the disclosure.
Figure 8:
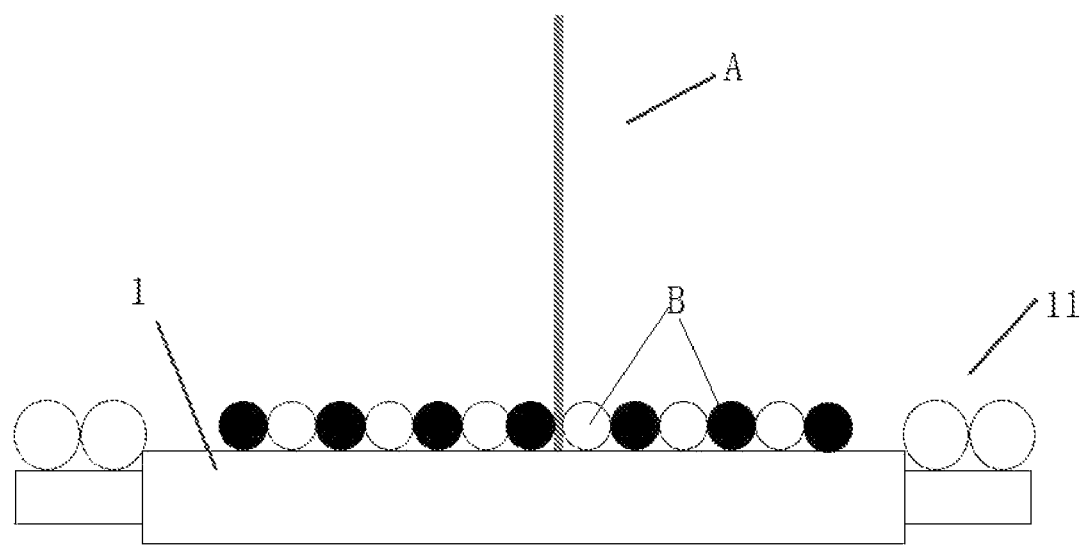
FIG. 8 is a front view of the processed surface when a first layer of a processed part is printed and a reinforced fiber is not yet operated disclosed by an embodiment of the disclosure.
Figure 9:
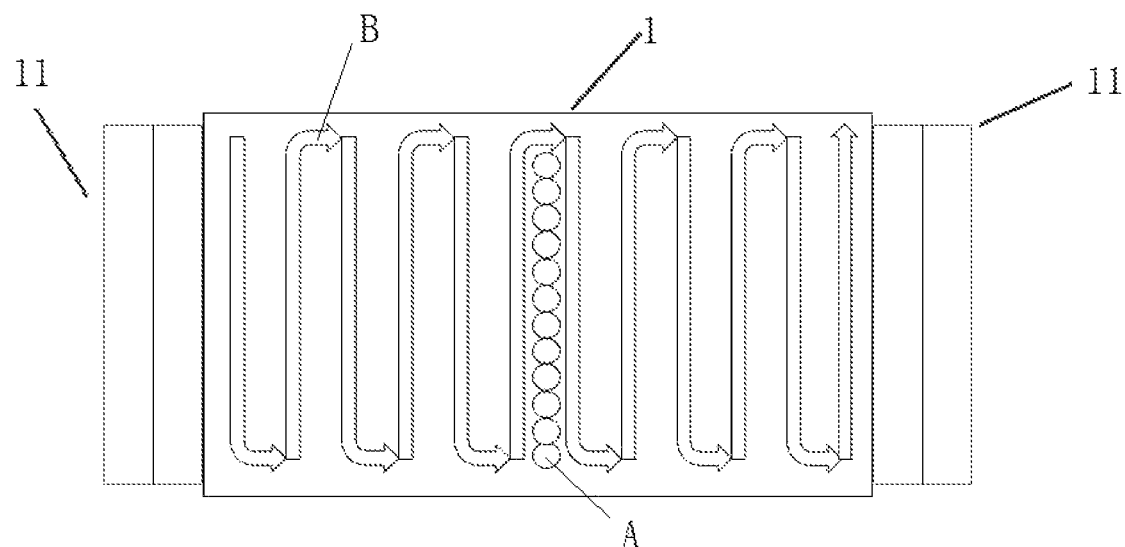
FIG. 9 is a top view of the processed surface when the first layer of the processed part is printed and the reinforced fiber is not yet operated.
Figure 10:
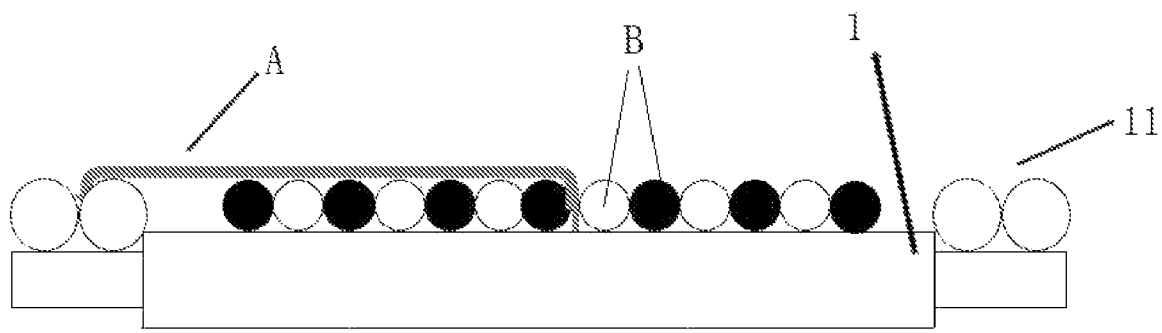
FIG. 10 is a front view of the processed surface after the first layer of the processed part is printed and the reinforced fiber is operated disclosed by an embodiment of the disclosure.
Figure 11:
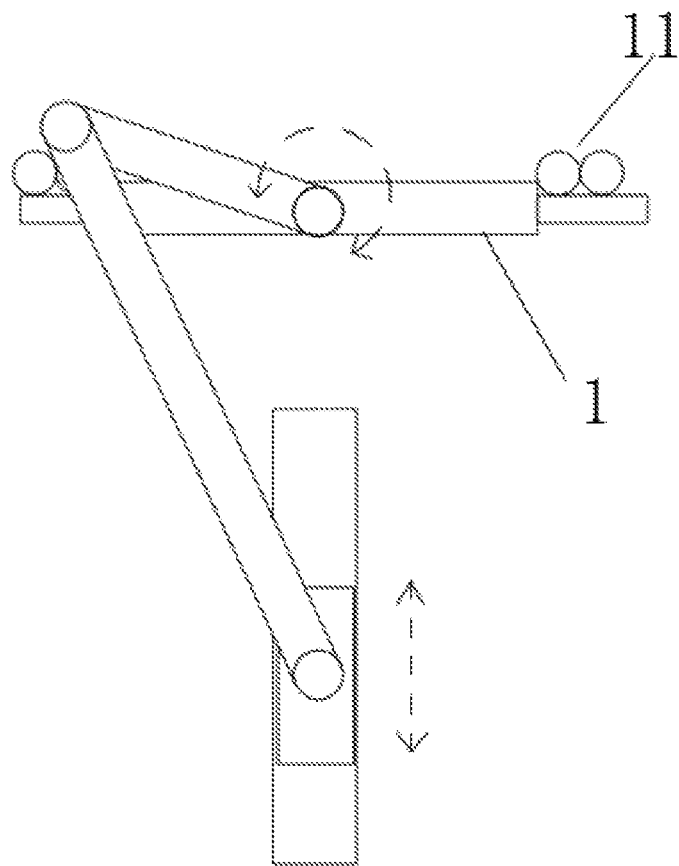
FIG. 11 a state of the fiber pulling device after the first layer of the processed part is printed and the reinforced fiber is operated disclosed by an embodiment of the disclosure.

As shown in FIG. 6, in the initial state, the reinforced fiber filaments are arranged in a vertical row at a specific position of the printing platform 1. When the external controller controls the robotic arm 2 to drive the additive device to complete the first layer of printing, as shown in FIG. 7, it is the state of the connecting rod driving mechanism at this time. As shown in FIGS. 8 to 9, the two figures represent the positions of the reinforced fiber A in the front view direction and the plan view direction of the printing platform 1 at this time. In FIG. 8, the circle represents the fiber tow that is alternately printed back and forth, and the direction of the arrow in FIG. 9 is the printing direction of the fiber tow B. When the first layer is printed, the grabbing unit 41 is controlled to grab the reinforced fiber A to the clamping device 11 on the left side of the printing platform 1. As shown in FIG. 10, the intersecting state of reinforced fiber A and the printed fiber tow of the first layer, and FIG. 11 is the state of the connecting rod driving mechanism at this time.

Figure 12:
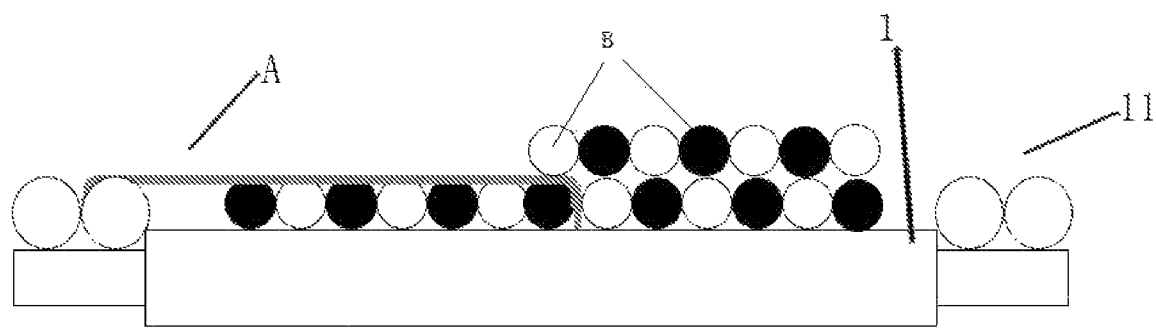
FIG. 12 is a schematic view of a printing process of a second layer of the continuous fiber reinforced composite material disclosed in an embodiment of the disclosure.
Figure 13:
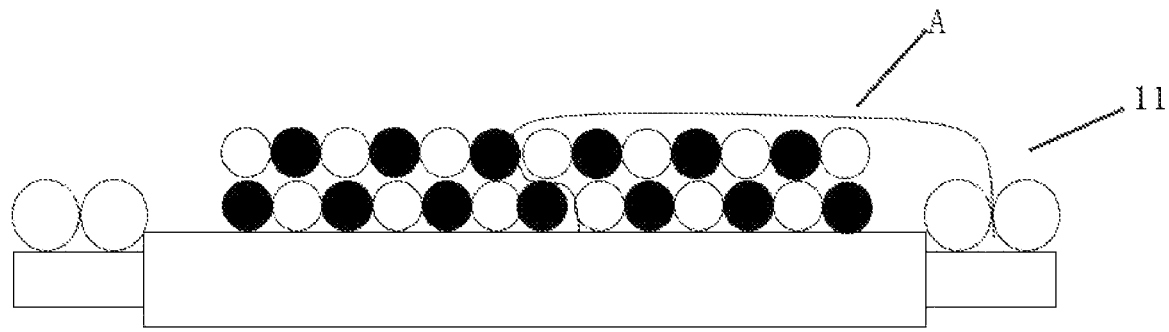
FIG. 13 is a schematic view of weaving the reinforced fiber in the second layer of the continuous fiber reinforced composite material disclosed in an embodiment of the disclosure.
Figure 14:
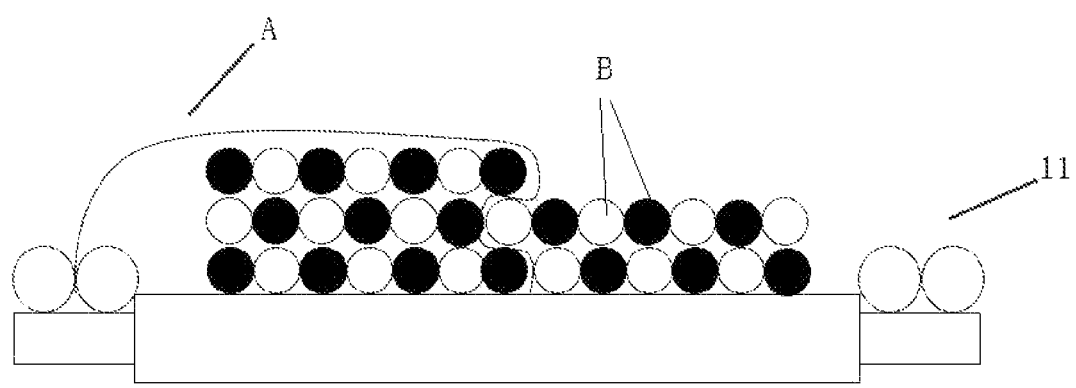
FIG. 14 is a schematic view of weaving the reinforced fiber in a third layer of the continuous fiber reinforced composite material disclosed in an embodiment of the disclosure.
Figure 15:
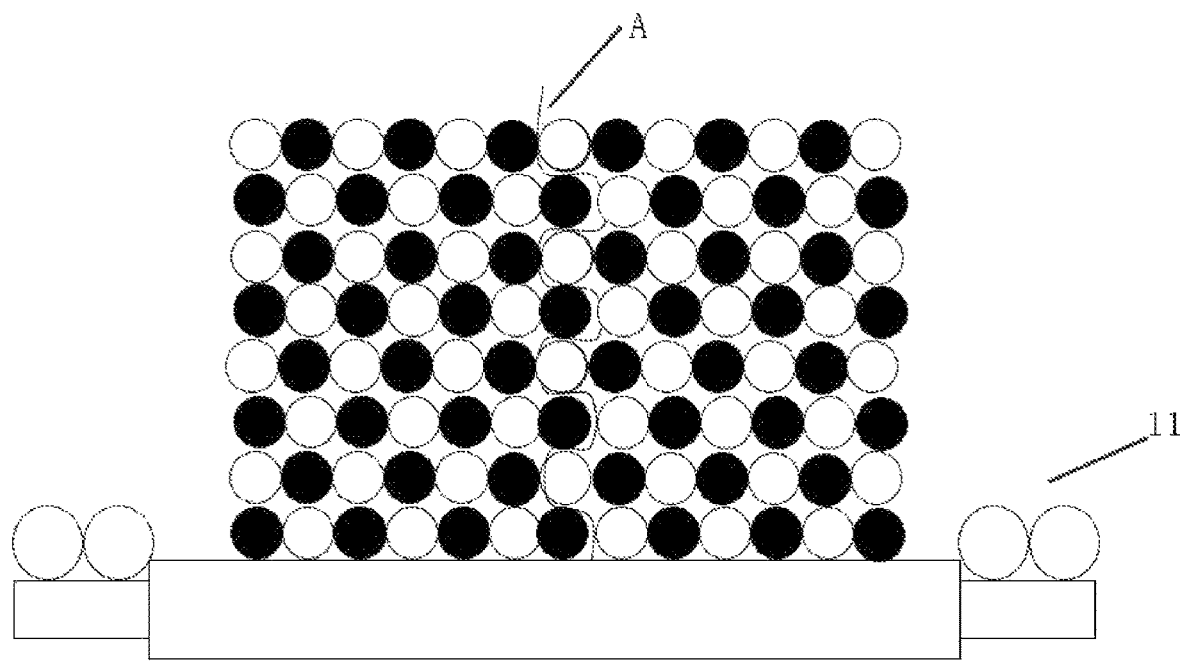
FIG. 15 is a schematic view of printing a multi-layer continuous fiber reinforced composite material disclosed in an embodiment of the disclosure.

As shown in FIG. 12, the second layer of fiber tow continues to be printed until the specific position where the reinforced fiber A is located. As shown in FIG. 13, the reinforced fiber A is grabbed and turned over to the clamping device 11 on the right side of the printing platform 1 to be fixed. As shown in FIG. 3, subsequent printing of the second layer then proceeds to be completed. As shown in FIG. 14, the reciprocating cycle is repeated until the printing is completed and until a wavy or serpentine continuous fiber-reinforced composite material resistant to inter-layer tearing is obtained as shown in FIG. 15.

During the layer-by-layer printing process of the apparatus of this embodiment, through the rotating unit and the turning unit, the displacement device works with the multi-degree-of-freedom movement of the robotic arm to keep the surface of the fiber tow perpendicular to the pressing roller at all times, so as to complete the printing of continuous fiber reinforced composite part.

Figure 16:
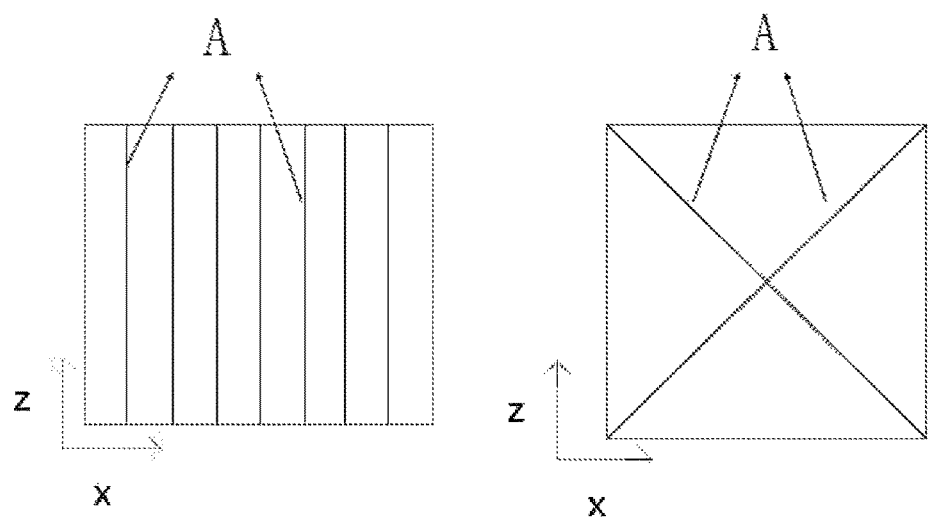
FIG. 16 is a schematic view of mixed weaving of the reinforced fiber in a longitudinal direction (left) and in a diagonal direction (right) disclosed in an embodiment of the disclosure.

In addition, besides the vertical fiber reinforcement method introduced in this embodiment, there are various reinforcement methods. As shown in FIG. 16, in the layer-by-layer printing process, by changing the winding position of the reinforced fiber A at each layer, the reinforcement of the composite material in different directions such as the vertical direction and the diagonal crossing direction can be formed, and the weaving form such as a cross-shaped cross can also be achieved. Moreover, the predetermined number of reinforced fiber A can also be set in multiple lines and rows as required, so as to achieve stronger inter-layer bonding.

Embodiment 3

In this embodiment, a multi-degree-of-freedom additive mixed weaving method for a continuous fiber reinforced composite material is provided. The method can be achieved on multi-degree-of-freedom additive mixed weaving apparatus for the continuous fiber reinforced composite material described above, and the method includes the following steps.

In S1, according to shape information of a workpiece to be printed, a longitudinal row of reinforced fiber is pre-arranged on a specific position of the printing platform 1.

In S2, the controller then controls the robotic arm 2 to drive the additive device 3 to move along the predetermined path. The tow feeding mechanism 33 sends out the fiber tow on the printing platform 1, and then the robotic arm 2 controls the laser 34 to irradiate laser light on the fiber tow to melt the fiber tow. During this process, the controller controls the robotic arm 2 to drive the pressing roller 31 on the additive device 3 to always be perpendicular to the printing platform 1. After the melted fiber tow is obtained, the robotic arm 3 is controlled to drive the pressing roller 31 to press the melted fiber tow vertically downward to make it densified. When the number of printing layers exceeds two layers, the fiber tow of adjacent layers can be combined more closely after being pressed.

In S3, when printing reaches the reinforced fiber of the current layer, printing stops, and the fiber pulling device 4 is driven to move to grab the reinforced fiber. To be specific, when the fiber pulling device 4 grabs the reinforced fiber, the slider 43 moves upward on the guiding rod 42 driven by an electric driving mechanism such as a motor. The slider 43 drives the connecting rod 44 to rotate around the connecting point of the connecting rod 44 and the slider 43 and then drives the crank 45 to rotate around the connecting point of the crank 45 and the printing platform 1. In this way, the grabbing unit 41 rotates around the connecting point between the crank 45 and the printing platform 1 to pull the reinforced fiber, so that the reinforced fiber crosses and weaves the fiber tow of the current layer printed on the surface of the printing platform in the front and rear directions. After the crossing and weaving, the robotic arm 2 then controls the pressing roller 31 to press the reinforced fiber vertically.

In S4, the robotic arm 2 is controlled to drive the additive device to restart printing a subsequent position of the layer until the layer is completely printed.

In S5, steps S2 to S4 are repeated, printing is carried out in the direction opposite to the previous layer, and the additive mixed weaving is completed alternately and layer by layer. After the printing is completed, the reinforced fiber between two adjacent layers of fiber tows is in an S shape on a plane perpendicular to the printing platform, and multiple S shapes are connected to form wavy reinforced fibers.

In this embodiment, a plurality of rows of reinforced fibers are pre-set, and the composite material after additive mixed weaving includes a plurality of wavy reinforced fibers. Further, the plurality of wavy reinforced fibers is also located on the same plane.

In other more preferably embodiments, the included angle between the plurality of wavy reinforced fibers on the same plane and the plane where the printing platform is located is an acute angle and/or a right angle. That is, the wavy reinforced fibers after weaving are either all perpendicular to the fiber tow of each layer and are then reinforced in the z-axis direction, all of them form acute angles or obtuse angles with each layer of fiber tow and are then reinforced in the x-axis and z-axis directions, or the wavy reinforced fibers cross each other and are then reinforced in the form of diagonal lines.

The above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A multi-degree-of-freedom additive mixed weaving apparatus for a continuous fiber reinforced composite material, comprising a printing platform, a robotic arm, an additive device, and a fiber pulling device, wherein:
    a lower surface of the printing platform is provided with a displacement device, and the displacement device is used to rotate the printing platform horizontally and adjust a pitch angle of the printing platform,
    the additive device is located above the printing platform and is connected to one end of the robotic arm, and the additive device is provided with a pressing roller, the pressing roller attached to the additive device with a support rod,
    the robotic arm comprises a plurality of rotating joints used to drive the additive device to print and melt a fiber tow on the printing platform according to a predetermined path,
    the fiber pulling device is disposed on the printing platform and is used to grab a pre-set vertical reinforced fiber and make it cross-weave with the fiber tow in each layer of printing, and
    when working, the robotic arm drives the additive device to print, and the displacement device drives the printing platform to move with the additive device, so that a central axis of the support rod of the pressing roller is always perpendicular to a horizontal plane defined by the lower surface of the printing platform to press the melted fiber tow and the reinforced fiber cross-woven with the fiber tow,
    wherein the additive device comprises a fixed platform, an upper surface of the fixed platform is connected to one end of the robotic arm, and a lower surface of the fixed platform is provided with a tow feeding mechanism and a laser, and wherein the tow feeding mechanism is used to output the fiber tow onto the printing platform, and the laser is used to melt the fiber tow.

2. The multi-degree-of-freedom additive mixed weaving apparatus for the continuous fiber reinforced composite material according to claim 1, wherein the pressing roller is disposed at a center of the lower surface of the fixed platform, and both the tow feeding mechanism and the laser are disposed at one side of the pressing roller.

3. The multi-degree-of-freedom additive mixed weaving apparatus for the continuous fiber reinforced composite material according to claim 1, wherein lower ends of the pressing roller, the tow feeding mechanism, and the laser all face toward a same processing point on the printing platform.

4. The multi-degree-of-freedom additive mixed weaving apparatus for the continuous fiber reinforced composite material according to claim 2, wherein a cutting device is also disposed on the fixed platform, and the cutting device is disposed on another side of the pressing roller for cutting the fiber tow sent out by the tow feeding mechanism.

5. The multi-degree-of-freedom additive mixed weaving apparatus for the continuous fiber reinforced composite material according to claim 1, wherein the fiber pulling device comprises a grabbing unit and a connecting rod driving mechanism, wherein
    the connecting rod driving mechanism comprises a guiding rod, a slider, a connecting rod, and a crank, an upper end of the guiding rod is fixed onto the displacement device, the slider is disposed on the guiding rod and is able to move up and down on the guiding rod, one end of the connecting rod is connected to the slider, and another end thereof is connected to one end of the crank, another end of the crank is fixed onto a lateral side of the printing platform, the grabbing unit is disposed at a connecting joint of the connecting rod and the crank, and the crank and a fixing point of the printing platform are located directly above the slider.

6. The multi-degree-of-freedom additive mixed weaving apparatus for the continuous fiber reinforced composite material according to claim 1, wherein the printing platform is further provided with a clamping device thereon, the clamping device is used to fix the reinforced fiber cross-woven with each layer of fiber tow, the robotic arm comprises six rotating joints, the displacement device comprises a base, a rotating unit, and a turning unit from bottom to top, wherein an upper end of the turning unit is connected to the lower surface of the printing platform, and a lower end of the turning unit is connected to the base, and upper and lower ends of the rotating unit are respectively connected to the turning unit and the base.

* * * * *